United States Patent
Barrowman et al.

(10) Patent No.: US 8,954,750 B2
(45) Date of Patent: *Feb. 10, 2015

(54) SECURE PIN ENTRY DEVICE

(71) Applicant: Verifone, Inc., San Jose, CA (US)

(72) Inventors: John Henry Barrowman, Knoxville, TN (US); Douglas L. Manchester, Rocklin, CA (US)

(73) Assignee: Verifone, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/088,756

(22) Filed: Nov. 25, 2013

(65) Prior Publication Data

US 2014/0082756 A1  Mar. 20, 2014

Related U.S. Application Data

(63) Continuation of application No. 12/985,898, filed on Jan. 6, 2011, now Pat. No. 8,621,235.

(51) Int. Cl.
*G06F 21/00* (2013.01)
*G06F 21/83* (2013.01)

(52) U.S. Cl.
CPC ...................................... *G06F 21/83* (2013.01)
USPC ......................................................... 713/189

(58) Field of Classification Search
CPC ..... G06F 21/554; G06F 21/86; G07F 19/207; G07F 19/2055
USPC .......................................................... 726/34
See application file for complete search history.

(56) References Cited

U.S. PATENT DOCUMENTS

| | | | |
|---|---|---|---|
| 3,466,643 | A | 9/1969 | Moorefield |
| 3,735,353 | A | 5/1973 | Donovan et al. |
| 3,772,674 | A | 11/1973 | Jackson |
| 3,818,330 | A | 6/1974 | Hiroshima et al. |
| 4,486,637 | A | 12/1984 | Chu |

(Continued)

FOREIGN PATENT DOCUMENTS

| | | |
|---|---|---|
| DE | 2 241 738 | 8/1974 |
| DE | 601 01 096 | 7/2004 |

(Continued)

OTHER PUBLICATIONS

A hole in the security wall: ATM hacking; Danny Bradbury; Network Security; ACM; Jun. 2010.*

(Continued)

*Primary Examiner* — Luu Pham
*Assistant Examiner* — James Turchen
(74) *Attorney, Agent, or Firm* — Sughrue Mion, PLLC

(57) ABSTRACT

A secure PIN entry device including a PIN entry assembly operative to receive a PIN from a user, a PIN entry prompter operative when actuated to prompt a user to enter a PIN via the PIN entry assembly, a PIN entry prompt security check enabled controller operative to prevent operation of the PIN entry prompter unless a predetermined security check has been successfully completed and security check functionality operative to check at least part of the PIN entry device for the presence of an unauthorized PIN eavesdropping element thereat and to provide an output to the PIN entry prompt security check enabled controller indicating whether the predetermined security check has been successfully completed.

15 Claims, 4 Drawing Sheets

(56) References Cited

U.S. PATENT DOCUMENTS

| | | |
|---|---|---|
| 4,527,030 A | 7/1985 | Oelsch |
| 4,593,384 A | 6/1986 | Kleijne |
| 4,749,368 A | 6/1988 | Mouissie |
| 4,807,284 A | 2/1989 | Kleijne |
| 4,847,595 A | 7/1989 | Okamoto |
| 5,086,292 A | 2/1992 | Johnson et al. |
| 5,117,457 A | 5/1992 | Comerford |
| 5,175,443 A | 12/1992 | Tabuchi |
| 5,237,307 A | 8/1993 | Gritton |
| 5,239,664 A | 8/1993 | Verrier et al. |
| 5,298,884 A | 3/1994 | Gilmore |
| 5,353,350 A | 10/1994 | Unsworth et al. |
| 5,506,566 A | 4/1996 | Oldfield et al. |
| 5,559,311 A | 9/1996 | Gorbatoff |
| 5,586,042 A * | 12/1996 | Pisau et al. ............... 702/65 |
| 5,627,520 A | 5/1997 | Grubbs et al. |
| 5,675,319 A | 10/1997 | Rivenberg et al. |
| 5,861,662 A | 1/1999 | Candelore |
| 5,877,547 A | 3/1999 | Rhelimi |
| 5,998,858 A | 12/1999 | Little et al. |
| 6,288,640 B1 | 9/2001 | Gagnon |
| 6,355,316 B1 | 3/2002 | Miller et al. |
| 6,359,338 B1 | 3/2002 | Takabayashi |
| 6,396,400 B1 | 5/2002 | Epstein, III et al. |
| 6,414,884 B1 | 7/2002 | Defelice et al. |
| 6,438,825 B1 | 8/2002 | Kuhn |
| 6,463,263 B1 | 10/2002 | Feilner et al. |
| 6,466,118 B1 | 10/2002 | Van Zeeland et al. |
| 6,563,488 B1 | 5/2003 | Rogers et al. |
| 6,646,565 B1 | 11/2003 | Fu et al. |
| 6,669,100 B1 | 12/2003 | Rogers et al. |
| 6,710,269 B2 | 3/2004 | Kunigkeit |
| 6,830,182 B2 | 12/2004 | Izuyama |
| 6,853,093 B2 | 2/2005 | Cohen et al. |
| 6,874,092 B1 | 3/2005 | Motoyama et al. |
| 6,912,280 B2 | 6/2005 | Henry |
| 6,917,299 B2 | 7/2005 | Fu et al. |
| 6,921,988 B2 | 7/2005 | Moree |
| 6,936,777 B1 | 8/2005 | Kawakubo |
| 7,024,565 B1 * | 4/2006 | Beiley et al. ............ 713/194 |
| 7,170,409 B2 | 1/2007 | Ehresvard et al. |
| 7,270,275 B1 | 9/2007 | Moreland et al. |
| 7,283,066 B2 | 10/2007 | Shipman |
| 7,403,115 B2 * | 7/2008 | Yuzik ....................... 340/540 |
| 7,832,628 B2 | 11/2010 | Mittler |
| 7,843,339 B2 * | 11/2010 | Kirmayer ................. 340/562 |
| 7,898,413 B2 | 3/2011 | Hsu et al. |
| 8,621,235 B2 | 12/2013 | Barrowman et al. |
| 2004/0031673 A1 | 2/2004 | Levy |
| 2004/0118670 A1 | 6/2004 | Park et al. |
| 2004/0120101 A1 | 6/2004 | Cohen et al. |
| 2005/0081049 A1 | 4/2005 | Nakayama et al. |
| 2005/0184870 A1 | 8/2005 | Galperin et al. |
| 2006/0049255 A1 | 3/2006 | Von Mueller et al. |
| 2006/0049256 A1 | 3/2006 | Von Mueller et al. |
| 2006/0192653 A1 | 8/2006 | Atkinson et al. |
| 2007/0040674 A1 | 2/2007 | Hsu |
| 2007/0102272 A1 | 5/2007 | Sano et al. |
| 2007/0152042 A1 | 7/2007 | Mittler |
| 2007/0204173 A1 * | 8/2007 | Kuhn ....................... 713/194 |
| 2008/0135617 A1 | 6/2008 | Aviv |
| 2008/0278353 A1 * | 11/2008 | Smith et al. ............. 341/22 |
| 2008/0278355 A1 * | 11/2008 | Moore et al. ............ 341/33 |
| 2010/0026313 A1 * | 2/2010 | Bartley et al. .......... 324/548 |
| 2011/0063109 A1 | 3/2011 | Ostermoller |
| 2011/0095919 A1 * | 4/2011 | Ostermoller et al. .... 341/33 |
| 2011/0215938 A1 | 9/2011 | Neo et al. |
| 2011/0248860 A1 | 10/2011 | Avital et al. |
| 2012/0106113 A1 | 5/2012 | Kirmayer et al. |
| 2012/0180140 A1 | 7/2012 | Barrowman et al. |

FOREIGN PATENT DOCUMENTS

| | | |
|---|---|---|
| EP | 0 375 545 | 6/1990 |
| EP | 0558222 | 8/1999 |
| EP | 1421549 | 5/2004 |
| EP | 1432031 | 6/2004 |
| EP | 03257680 | 6/2004 |
| EP | 1528584 | 5/2005 |
| EP | 1589405 | 10/2005 |
| FR | 2911000 | 7/2008 |
| GB | 892198 | 3/1962 |
| GB | 1 369 739 | 10/1974 |
| GB | 8608277 | 5/1986 |
| GB | 2372363 | 8/2002 |
| JP | 2002108711 | 4/2002 |
| JP | 2003100169 | 4/2003 |
| WO | 89/00318 | 1/1989 |
| WO | 01/63994 | 8/2001 |
| WO | 2005/086546 | 9/2005 |
| WO | 2009/091394 | 7/2009 |
| WO | 2009/103594 A1 | 8/2009 |

OTHER PUBLICATIONS

Manipulated ATMs—The H Security: News and Features; Attack of the card cloners; Mike Barwise et al; Dec. 14, 2007; Retrieved from archive.org (Wayback Machine) on Oct. 30, 2014; http://www.h-online.com/security/features/Manipulated-ATMs-746193.html.*

Communication dated Aug. 5, 2014, issued by the European Patent Office in counterpart European application No. 12732272.5.

An International Preliminary Report on Patentability dated Jul. 19, 2011 which issued during the prosecution of Applicant's PCT/IL2009/000724.

An Office Action dated Apr. 10, 2012, which issued during the prosecution of U.S. Appl. No. 12/758,150.

An International Search Report and a Written Opinion both dated Apr. 30, 2012, which issued during the prosecution of Applicant's PCT/US2012/020142.

An Office Action dated Oct. 26, 2004, which issued during the prosecution of U.S. Appl. No. 10/326,726.

An Office Action dated May 28, 2004, which issued during the prosecution of U.S. Appl. No. 10/326,726.

Van Ess, Dave; "Capacitive touch switches for automotive applications", http://www.automotivedesignline.com/, Feb. 2006.

Victor Kremin, et al., "Capacitive sensing—waterproof capacitance sensing", Cypress Perform, Dec. 2006.

An Office Action dated Oct. 26, 2012, which issued during the prosecution of U.S. Appl. No. 12/985,898.

An Office Action dated Apr. 23, 2013, which issued during the prosecution of U.S. Appl. No. 12/985,898.

A Notice of Allowance dated Aug. 30, 2013, which issued during the prosecution of U.S. Appl. No. 12/985,898.

An Office Action dated May 13, 2010, which issued during the prosecution of Applicant's U.S. Appl. No. 11/845,435.

A Notice of Allowance dated Sep. 10, 2010, which issued during the prosecution of Applicant's U.S. Appl. No. 11/845,435.

* cited by examiner

SECURE PIN ENTRY DEVICE

CROSS-REFERENCE TO RELATED PATENT APPLICATION

This is a continuation of application Ser. No. 12/985,898 filed Jan. 6, 2011, the disclosure of which is incorporated herein by reference.

REFERENCE TO RELATED APPLICATIONS

Reference is hereby made to U.S. patent application Ser. No. 11/845,435, filed Aug. 27, 2007, entitled Secure Point of Sale Device Employing Capacitive Sensors, now U.S. Pat. No. 7,843,339, the disclosure of which is hereby incorporated by reference.

FIELD OF THE INVENTION

The present invention relates to PIN entry devices and more particularly to secure PIN entry devices.

BACKGROUND OF THE INVENTION

The following publications are believed to represent the current state of the art:

U.S. Pat. Nos. 7,843,339; 7,170,409; 6,874,092; 6,853,093; 6,646,565; 6,438,825; 6,414,884; 6,359,338; 5,998,858; 5,877,547; 5,861,662; 5,675,319; 5,353,350; 5,237,307; 4,807,284 and 4,593,384;

U.S. Published Patent Application No. 2005/0184870;

European Patent Nos. EP0375545 and EP1432031;

Great Britain Patent No. GB2372363A;

Van Ess, Dave; "Capacitive Touch Switches for Automotive Applications," http://www.automotivedesignline.com, February 2006; and Kremlin, Victor, et al., "Capacitive Sensing—Waterproof Capacitance Sensing", Cypress Perform, December, 2006.

SUMMARY OF THE INVENTION

The present invention seeks to provide a secure data entry device, particularly useful for PIN entry devices.

There is thus provided in accordance with a preferred embodiment of the present invention a secure PIN entry device including a PIN entry assembly operative to receive a PIN from a user, a PIN entry prompter operative when actuated to prompt a user to enter a PIN via the PIN entry assembly, a PIN entry prompt security check enabled controller operative to prevent operation of the PIN entry prompter unless a predetermined security check has been successfully completed and security check functionality operative to check at least part of the PIN entry device for the presence of an unauthorized PIN eavesdropping element thereat and to provide an output to the PIN entry prompt security check enabled controller indicating whether the predetermined security check has been successfully completed.

Preferably, the controller is operative, in the event of the predetermined security check having discovered a bug, to at least one of provide an output alarm and disable one or more functions of the PIN entry device.

In accordance with a preferred embodiment of the present invention the controller also includes case open detection functionality. Additionally, the case open detection functionality is operative, in the event of a case open condition being detected, to at least one of provide an output alarm and disable one or more functions of the PIN entry device.

Preferably, the security check functionality includes bug detection functionality for checking at least part of the PIN entry device for the presence of an unauthorized PIN eavesdropping element thereat. Additionally, the bug detection functionality includes an electric field generator for simultaneously generating an electromagnetic field at a first multiplicity of locations in the PIN entry device and a second multiplicity of capacitance sensors at a second plurality of locations for sensing mutual capacitance between at least some of the first multiplicity of locations and at least some of the second multiplicity of locations resulting from the electromagnetic field at each of the first multiplicity of locations. Additionally or alternatively, the bug detection functionality includes self-capacitance sensing functionality for sensing self-capacitance of multiple elements of the secure PIN entry device.

In accordance with a preferred embodiment of the present invention the secure PIN device includes capacitance sensing functionality operative in a security scan mode and in a key entry detection mode. Additionally, the capacitance sensing functionality is operative in the key entry detection mode using autotuning functionality and in the security scan mode not using autotuning functionality. Additionally the capacitance sensing functionality is operative in the security scan mode to measure capacitance of elements of the device and compare the capacitance with a baseline capacitance corrected for at least one environmental factor. Preferably, the capacitance includes self-capacitance and mutual capacitance of the elements of the device.

In accordance with a preferred embodiment of the present invention the capacitance sensing functionality when operative in a security scan mode combines changes in sensed capacitance of a plurality of elements of the secure PIN device which exceed a predetermined threshold in order to ascertain whether a bug is present.

There is also provided in accordance with another preferred embodiment of the present invention a security check system operative to check at least part of a data entry device for the presence of an unauthorized data eavesdropping element thereat, the system including an electric field generator for simultaneously generating an electromagnetic field at a first multiplicity of locations in the data entry device and mutual capacitance sensing functionality for sensing mutual capacitance between at least some of the first multiplicity of locations and at least a second multiplicity of locations resulting from the electromagnetic field at each of the first multiplicity of locations.

In accordance with a preferred embodiment of the present invention at least some of the first multiplicity of locations are identical to at least some of the second multiplicity of locations. Additionally or alternatively, the mutual capacitance sensing functionality forms part of capacitance sensing functionality which is operative in a security scan mode and in a key entry detection mode.

Preferably, the capacitance sensing functionality is operative in the key entry detection mode using autotuning functionality and in the security scan mode not using autotuning functionality. Additionally or alternatively, the capacitance sensing functionality is operative in the security scan mode to measure capacitance of elements of the device and compare the capacitance with a baseline capacitance corrected for at least one environmental factor. Additionally or alternatively, the capacitance sensing functionality when operative in a security scan mode combines changes in sensed capacitance of a plurality of elements of the secure data device which exceed a predetermined threshold in order to ascertain whether a bug is present.

There is further provided in accordance with yet another preferred embodiment of the present invention a secure data entry device including a data entry assembly operative to receive data from a user, a data entry security check enabled controller operative to prevent receipt of the data by the data entry assembly unless a predetermined security check has been successfully completed and capacitance security check functionality operative to check at least part of the data entry device for the presence of an unauthorized data eavesdropping element thereat by sensing mutual capacitance of at least two elements of the data entry assembly and to provide an output to the data entry security check enabled controller indicating whether the predetermined security check has been successfully completed.

Preferably, the capacitance security check functionality forms part of capacitance sensing functionality which is operative in a security scan mode and in a key entry detection mode. In accordance with a preferred embodiment of the present invention the capacitance security check functionality is operative in the key entry detection mode using autotuning functionality and in the security scan mode not using autotuning functionality. Additionally or alternatively, the capacitance security check functionality is operative in the security scan mode to measure capacitance of elements of the device and compare the capacitance with a baseline capacitance corrected for at least one environmental factor. Additionally or alternatively, the capacitance security check functionality, when operative in a security scan mode, combines changes in sensed capacitance of a plurality of elements of the secure data entry which exceed a predetermined threshold in order to ascertain whether a bug is present.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1A:
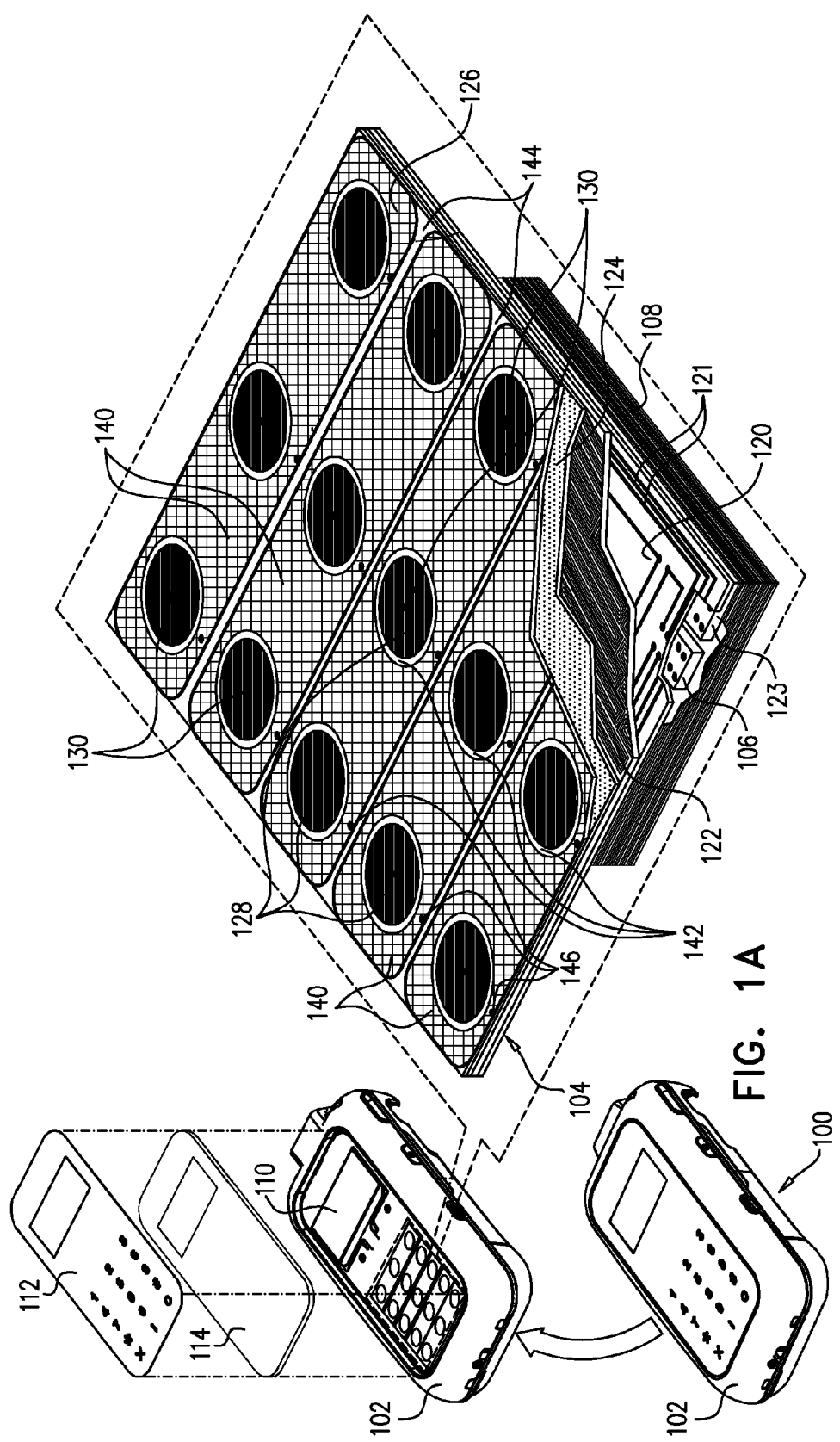
FIG. 1A is a simplified illustration of a touchscreen PIN entry device constructed and operative in accordance with a preferred embodiment of the present invention.

Reference is now made to FIG. 1A, which is a simplified illustration of a touchscreen PIN entry device 100 constructed and operative in accordance with a preferred embodiment of the present invention. PIN entry device 100 may be used for transactions, such as payment card transactions, for access points and for any other suitable purpose. As seen in FIG. 1A, the touchscreen PIN entry device 100 includes a housing 102 which encloses a secure touchscreen assembly 104 which communicates with touchscreen operation management circuitry and touchscreen security management circuitry both preferably embodied in a single integrated circuit 106, a preferred embodiment of which is a CY8C20666 chip, commercially available from Cypress Semiconductors, Inc., preferably located within a secure enclosure 108. A display 110 is also mounted within housing 102 alongside secure touchscreen assembly 104.

Preferably, but not necessarily, located within secure enclosure 108 is PIN entry operation circuitry, which preferably receives inputs from touchscreen operation management circuitry and from touchscreen security management circuitry and provides conventional PIN entry functionality, such as, for example, PIN entry prompting, PIN entry acceptance, PIN encryption, encrypted PIN transmission, device disable and security alarms. It is appreciated that PIN entry operation circuitry may be embodied in integrated circuit 106.

A user interface layer 112, on which appear key symbols used for PIN entry, such as 1, 2, 3, 4, 5, 6, 7, 8, 9, 0, * and #, and possibly other key symbols, is preferably mounted onto housing 102 and overlies a light guide layer 114, which lies intermediate the interface layer 112 and the secure touchscreen assembly 104.

Secure touchscreen assembly 104 preferably is embodied in a multilayer printed circuit board. A bottom layer 120 of the multilayer printed circuit board preferably includes circuit connections 121, including circuit connections between one or more elements of the secure touchscreen assembly 104, the touchscreen operation management circuitry, the touchscreen security management circuitry and the PIN entry operation circuitry as well as circuit connections with other circuitry located either inside or outside of the secure enclosure 108. Touchscreen security management circuitry preferably is operative to detect the presence of an unauthorized PIN eavesdropping element thereat and provide an output to PIN entry operation circuitry, indicating whether a predetermined security check has been successfully completed.

Overlying bottom layer 120 is a protective grid layer 122, which may form part of secure enclosure 108 and preferably extends therebeyond to provide anti-tamper protection to the underside of the secure touchscreen assembly 104. Protective grid layer 122 is preferably formed of a dense grid of electrical conductors which, together with similar grids which define protective enclosure 108, is preferably connected to tamper protection circuitry 123 and which is operative to detect tampering and to provide an output indication responsive to tampering, which may be at least one of an output indication of tampering and disabling of one or more functions of the PIN entry device 100.

Overlying protective grid layer 122 is a ground layer 124 and overlying ground layer 124 is a pad layer 126, on which key pads 128 are formed at typically 15 key locations. Each key pad 128 is preferably connected to touchscreen operation management circuitry 106 by a via 130 and appropriate circuit connections 121.

A plurality of bug-sensing floods 140 are preferably formed on layer 126 and preferably extend in rows, galvanically insulated from key pads 128 by separations 142 and from each other by separations 144 but generally covering most of the area of layer 126 which is not covered by the key pads 128. Preferably, bug-sensing floods 140 are formed as meshes and are preferably connected to touchscreen operation management circuitry 106 by a via 146 and appropriate circuit connections 121.

Figure 1B:
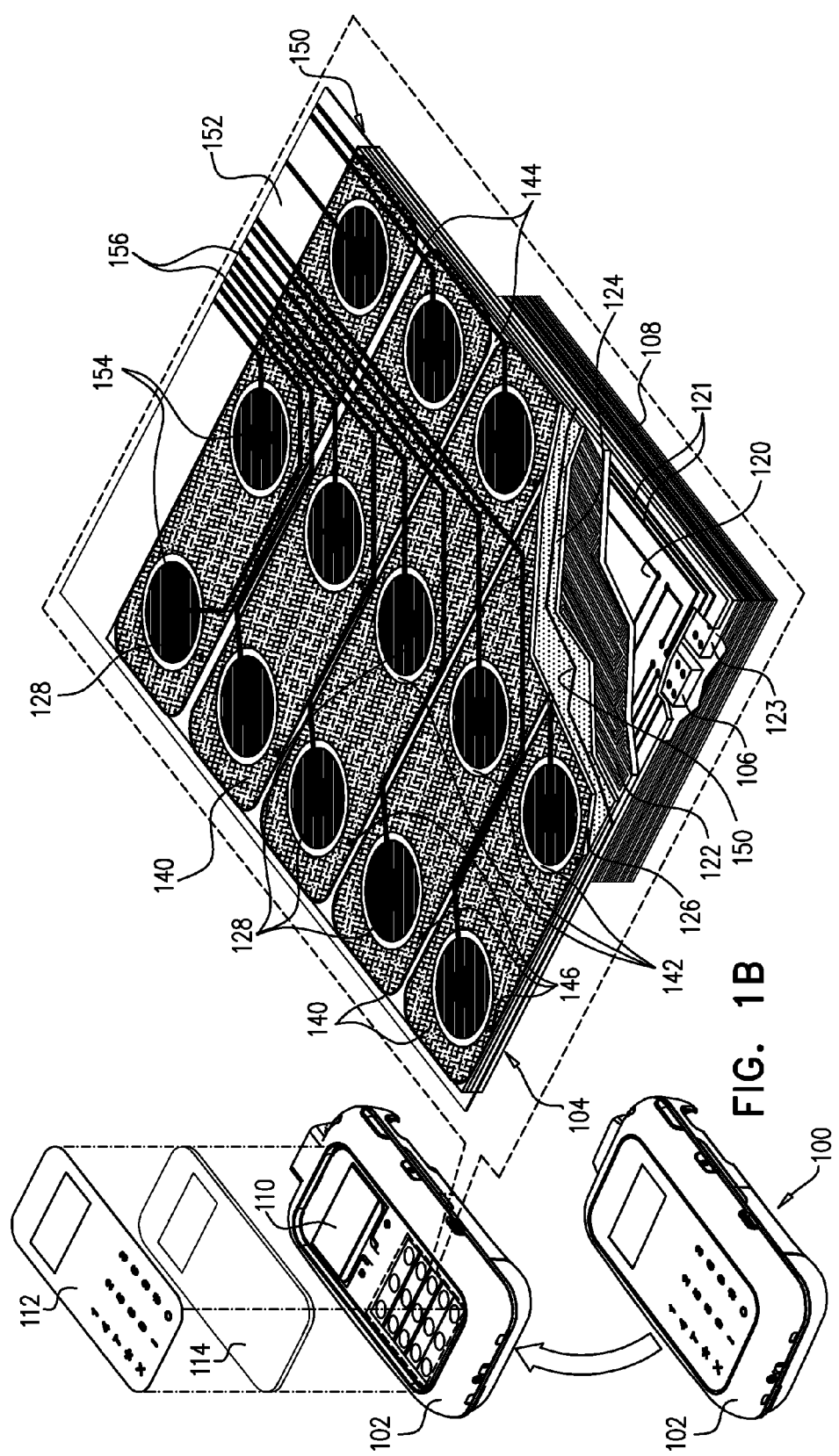
FIG. 1B is a simplified illustration of the touchscreen PIN entry device of FIG. 1A showing a malicious bug overlay, whose presence can be detected in accordance with a preferred embodiment of the present invention.

Reference is now made to FIG. 1B, which is a simplified illustration of the touchscreen PIN entry device of FIG. 1A showing a malicious bug overlay 150 which can be employed by nefarious persons for unauthorized PIN eavesdropping. Malicious bug overlays 150 may be placed by such nefarious persons overlying keypads 128, particularly covering at least part of the PIN entry device and specifically overlying keys which are used for Personal Identification Number (PIN) entry, as in credit, debit and other payment transactions. All of the elements of FIG. 1A are shown in FIG. 1B and designated by the same reference numerals used in FIG. 1A.

The malicious bug overlay 150 may be one or more of many possible malicious bugs. The example shown in FIG. 1B employs a dielectric substrate 152, such as MYLAR® film, having formed thereon a plurality of conductive pads 154, which are connected to a malicious capacitive sensing chip (not shown) by conductors 156. The malicious arrangement of the malicious bug overlay 150 is normally to align each of the conductive pads 154 over a corresponding key pad 128, such that key engagements are sensed by the malicious capacitive sensing chip.

Figure 2A:
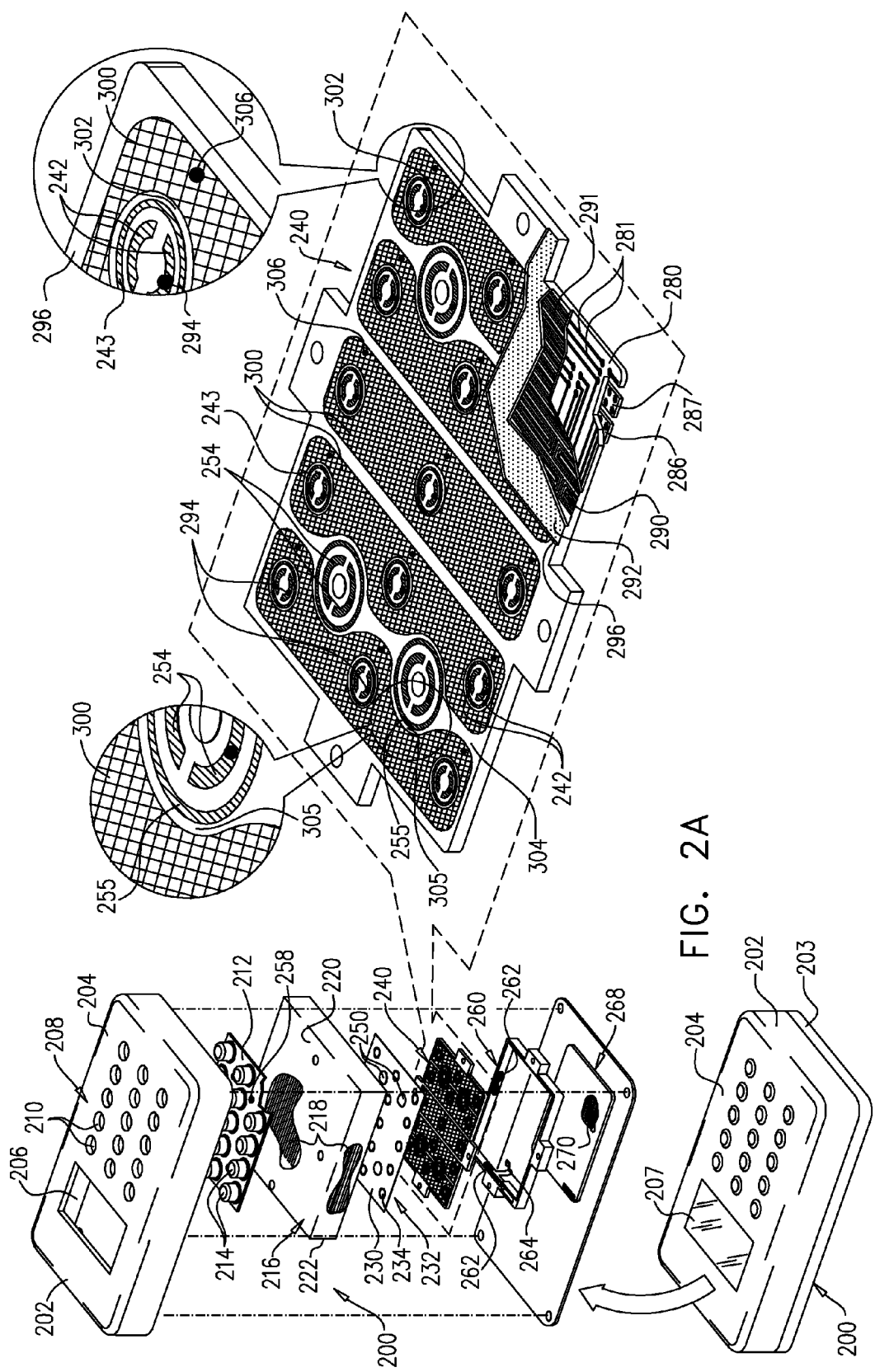
FIG. 2A is a simplified illustration of another embodiment of a PIN entry device constructed and operative in accordance with a preferred embodiment of the present invention.

Reference is now made to FIG. 2A, which is a simplified illustration of another embodiment of a PIN entry device 200 constructed and operative in accordance with a preferred embodiment of the present invention. As seen in FIG. 2A, PIN entry device 200 includes a top housing element 202 which, together with a bottom housing element 203, defines a PIN entry device housing. Housing element 202 includes, on a top surface 204 thereof, a display aperture 206, through which a display 207 may be viewed, and an array 208 of key apertures 210.

A key mat 212, preferably formed of a resilient plastic or rubber, defines a plurality of depressible keys 214, preferably integrally formed with key mat 212, which partially extend through key apertures 210. There is provided a flexible resilient protective partial enclosure 216, which includes an anti-tampering grid 218, formed of a multiplicity of interconnected anti-tampering electrical conductors, on a top surface 220 thereof and on side surfaces 222 thereof.

Disposed within optional protective partial enclosure 216, underlying top surface 220, is a key contact pad 230. Key contact pad 230 is preferably a resilient, generally planar, pad formed of flexible and resilient plastic or rubber, having an array 232 of raised resilient domes 234.

Disposed in predetermined spaced relationship with key contact pad 230 is an electrical circuit board 240, which functions, inter alia, as a key contact board, defining a plurality of pairs of adjacent electrical contact pads 242, each pair of adjacent electrical contact pads 242 underlying a dome 234. The mutual arrangement of key contact pad 230 and of electrical circuit board 240 is such that depression of a key 214 by the finger of a user causes a conductor (not shown) associated with a corresponding dome 234 to establish electrical contact with and between a corresponding pair of electrical contact pads 242 lying thereunder and in registration therewith. When key 214 is not depressed, no electrical contact exists between the conductor and the pair of corresponding electrical contact pads 242 or between the adjacent pads of the pair. One or more guard rings 243, which may be connected to ground or be floating, may be provided surrounding each pair of electrical contact pads 242 to provide anti-tamper protection.

In accordance with a preferred embodiment of the present invention, case-open switches, which sense physical tampering and opening of the housing, are also preferably located within partial enclosure 216. In the illustrated embodiment, the case-open switches are each embodied in a raised resilient dome 250 formed on key contact pad 230. Domes 250 preferably extend outwardly from the surface of key contact pad 230 to a greater extent than do domes 234.

Disposed on electrical circuit board 240 underlying each of domes 250 are a corresponding number of pairs of adjacent electrical contact pads 254. The arrangement of key contact pad 230 and of electrical circuit board 240 is such that as long as the housing is closed, conductors (not shown) associated with each of domes 250 each are in electrical contact with and between a corresponding pair of electrical contact pads 254 lying thereunder and in registration therewith. One or more guard rings 255, which may be connected to ground or be floating, may be provided surrounding each pair of electrical contact pads 254 to provide anti-tamper protection.

When the housing is closed, domes 258 in key mat 212 are urged towards optional partial enclosure 216 and urge partial enclosure 216 and thus corresponding domes 250 and the conductors associated therewith on the underside surfaces thereof, into electrical contact with corresponding electrical contact pads 254. When the housing is opened, no electrical contact exists between the conductors and corresponding pairs of electrical contact pads 254 or between the adjacent pads of the pair of electrical contact pads 254, and a suitable alarm or disablement occurs.

Disposed below electrical circuit board 240, there is preferably provided a peripheral protective grid element 260 which includes an anti-tampering grid 262, preferably coupled to a flexible cable 264, which is in turn connected to electrical circuit board 240. Peripheral protective grid element 260 preferably is located interiorly of the side surfaces 222 of enclosure 216. Fixedly attached to peripheral protective grid element 260 and preferably disposed therebelow is a bottom protective grid element 268. Element 268 preferably includes an anti-tampering grid 270.

Electrical circuit board 240 preferably is a multilayer printed circuit board. A bottom layer 280 preferably includes circuit connections 281 with keypad operation management circuitry 286 and keypad security management circuitry 287, circuit connections between one or more elements of circuitry 286 and one or more elements of circuitry 287 and circuit connections with other circuitry located either inside or outside of the secure enclosure formed by resilient protective partial enclosure 216, peripheral protective grid element 260 and bottom protective grid element 268.

Keypad operation management circuitry 286 operates in a conventional manner to sense electric contact between electrical contact pads 242, which represents a key stroke. Preferably, but not necessarily, located within the secure enclosure is PIN entry operation circuitry, providing conventional PIN entry functionality, such as, for example, PIN entry prompting, PIN entry acceptance, PIN encryption, encrypted PIN transmission, device disable and security alarms. It is appreciated that PIN entry operation circuitry may be embodied in integrated circuit 286, which may be an ASIC incorporated, for examples, in a PINPad 1000, commercially available from VeriFone, Inc.

Keypad security management circuitry 287 preferably includes bug sensing management circuitry and is preferably embodied in a CY8C20666 chip, commercially available from Cypress Semiconductors, Inc.

Overlying bottom layer 280 is a protective grid layer 290, which may form part of secure enclosure 260. Protective grid layer 290 is preferably formed of a dense grid of electrical conductors which defines an anti-tampering grid 291.

Anti-tampering grids 218, 262, 270 and 291 are preferably connected to tamper protection circuitry which may be integrated with keypad security management circuitry 287 and which is operative to detect tampering and to provide an output indication responsive to tampering, which may be at least one of an output indication of tampering and disabling of one or more functions of the PIN entry device 200.

Overlying protective grid layer 290 is a ground layer 292 and overlying ground layer 292 is a pad layer 296, on which electrical contact pads 242 are formed at typically 15 key locations. Each electric contact pad 242 is preferably connected to keypad security management circuitry 287 by a via 294 and appropriate circuit connections 281.

A plurality of bug-sensing floods 300 are preferably formed on layer 296 and preferably extend in rows, galvanically insulated from rings 243 by separations 302 and from each other by separations 304 and galvanically insulated from rings 255 by separations 305 but generally covering most of the area of layer 296 which is not covered by the electric contact pads 242. Preferably, bug-sensing floods 300 are formed as grids and are preferably connected to keypad security management circuitry 287 by a via 306 and appropriate circuit connections 281.

It is appreciated that the embodiment of FIG. 2A is one example of a large number of different keypads, other than capacitive sensing keypads, in which the present invention may be useful. These include touchscreens which employ key press detection technology other than capacitive sensing, such as resistive touchscreens and optical touchscreens as well as other types of keypads. The present invention employs capacitive sensing for security purposes, even in such contexts where capacitive sensing is not employed for key-entry operation.

Figure 2B:
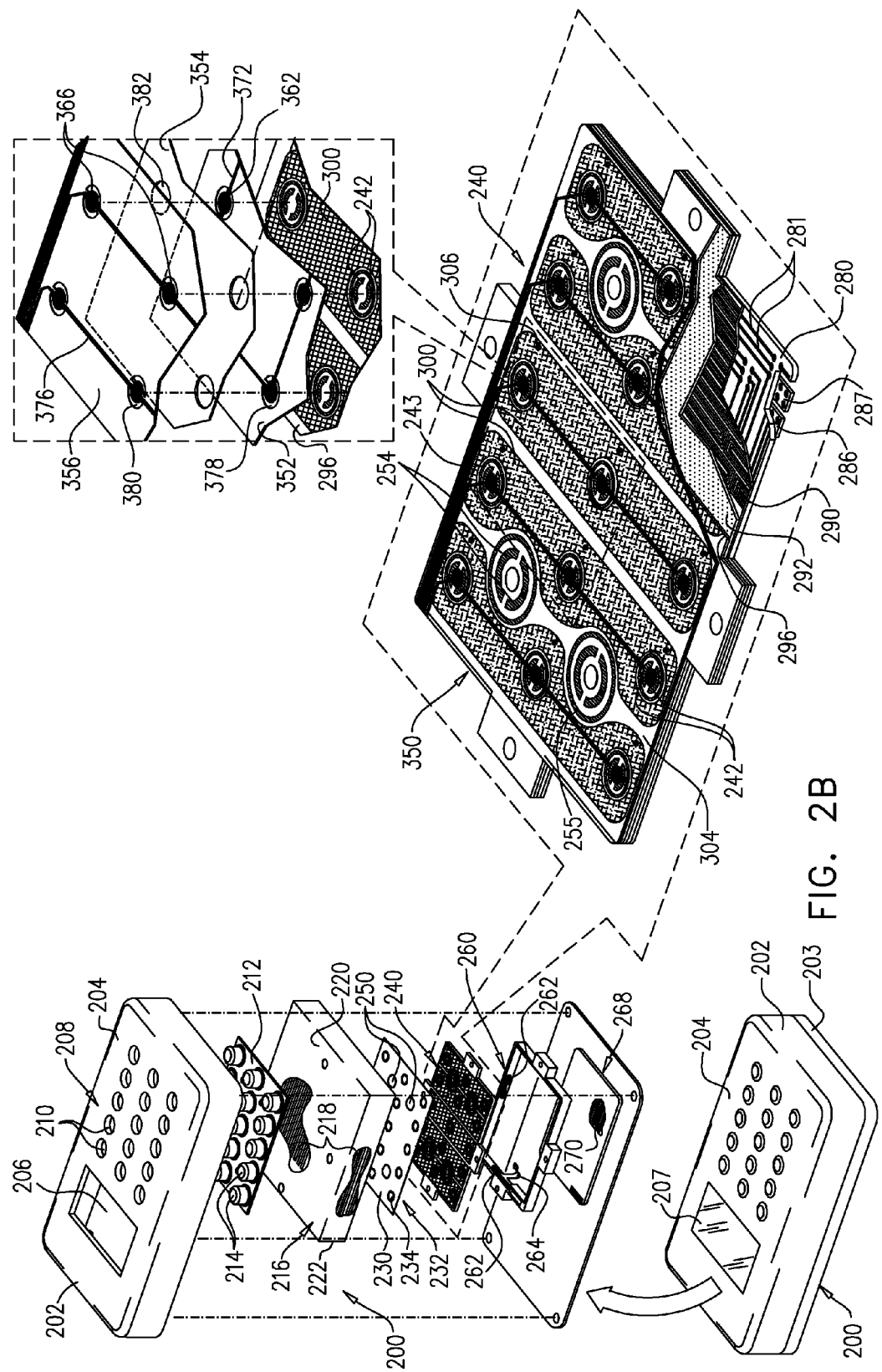
FIG. 2B is a simplified illustration of the PIN entry device of FIG. 2A showing a malicious bug overlay whose presence can be detected in accordance with a preferred embodiment of the present invention.

Reference is now made to FIG. 2B, which is a simplified illustration of the PIN entry device of FIG. 2A showing a malicious bug overlay 350, whose presence can be detected in accordance with a preferred embodiment of the present invention. All of the elements of FIG. 2A are shown in FIG. 2B and are designated by the same reference numerals used in FIG. 2A.

The malicious bug overlay 350 may be one or more of many possible malicious bugs. The example shown in FIG. 2B comprises three layers of dielectric substrates 352, 354 and 356, such as MYLAR® film. Layers 352 and 356 each have formed thereon a plurality of conductive pads, respectively 362 and 366, which are connected to a malicious key entry sensing chip (not shown) by respective conductors 372 and 376. Layers 352 and 356 are configured with apertures 378 and 380 generally surrounding conductive pads 362 and 366, respectively, and aligned with electrical contact pads 242 to enable normal PIN entry operation of the device. Similarly apertures (not shown) may be provided in all of substrates 352, 354 and 356 of the malicious bug overlay 350 to avoid actuation of the case-open switches.

Intermediate layers 352 and 356 of the malicious bug overlay 350 there is provided a spacer layer 354 having apertures 382 at the locations of conductive pads 362 and 366. The malicious arrangement of the malicious bug overlay 350 is normally to align each of the conductive pads 362 and 366 over a corresponding electrical contact pad 242, such that key engagements produce a closed circuit between respective pads 362 and 366 at apertures 382, which closed circuits are sensed by the malicious key entry sensing chip.

The operation of the devices described hereinabove with reference to FIGS. 1A-2B will now be described, initially generally and thereafter in greater detail. The devices of FIGS. 1A-2B preferably operate in a security scan mode in accordance with a preferred embodiment of the present invention, followed, in the absence of sensed bugs, by a generally conventional key entry detection mode. In the security scan mode of the present invention, capacitance of various elements in the device is used to detect the presence of a malicious overlay placed over the keys for surreptitiously sensing key entries, as well as other types of bugs.

Preferably, both self-capacitance and mutual capacitance of various elements of the device is sensed and changes are noted. The various elements of the device typically include keys and preferably also include areas outside of the keys. Conventional capacitive sensing techniques, such as CAPSENSE®, may be employed, not only for operation in conventional key entry detection mode, but also, in a non-conventional manner for operation in the security scan mode of the present invention. Capacitive sensing techniques may be used for operation in the security scan mode of the present invention by disabling autotuning functionality, such as SmartSense functionality of Cypress Semiconductors Inc., during operation in the security scan mode, but not in conventional key entry detection mode.

Preferably, all appropriate sensed values are encrypted.

In the description which follows, reference is made to a preferred embodiment of the present invention, shown in FIGS. 1A and 1B, wherein the self capacitance and mutual capacitance of two types of pads is sensed. One type is key pads, such as pads 128, of which 15 are normally present, and the other type is bug sensing floods 140, of which five are normally present. The bug sensing floods 140, are provided in accordance with a preferred embodiment of the present invention, particularly for operation in the security scan mode.

Conventional key entry detection is provided using firmware commercially available from Cypress Semiconductors Inc. under the trademark CAPSENSE®. This detection typically employs a 12-bit pseudo-random sequence generator to scan each pad 128, preferably in a manner having acceptable immunity from external noise sources and electromagnetic emission levels.

In this conventional key entry operation, the self capacitance of each pad 128, is read discretely and temporarily stored in a Static Random Access Memory (SRAM). These self-capacitance values are checked against the autotuning calibrated threshold values recorded at the factory at the time of manufacture. If a self-capacitance value for a given pad 128 meets or exceeds its threshold value, a corresponding bit is set in a key entry register. The foregoing conventional key entry detection is preferably carried out during operation of the autotuning functionality.

In accordance with a preferred embodiment of the present invention, malicious overlay detection is provided, while autotuning functionality is disabled as described below:

Preferably, the self-capacitance of each of bug sensing floods 140 is read discretely and temporarily stored in a SRAM. Each value is compared with a suitably temperature adjusted baseline self-capacitance value for the same flood 140, based on self capacitance calibration readings recorded at the factory at the time of manufacture. A suitable difference value is calculated and compared with a threshold. Exceedance of the threshold indicates the probable existence of a malicious overlay or other bug. It is appreciated that the functionality described in this paragraph is particularly useful in sensing bugs containing a conductor which is located in the area of the keys of the device. It is also appreciated that one or more of various types of suitable difference values may be calculated.

Additionally or alternatively, as described in the preceding paragraph, the self-capacitance of each of bug sensing floods 140 is read discretely and temporarily stored in a SRAM. Each value is compared with a suitably temperature adjusted baseline self-capacitance value for the same flood 140, based on self capacitance calibration readings recorded at the factory at the time of manufacture. Suitable difference values are calculated. However, as distinct from the functionality described in the preceding paragraph, the absolute values of the difference values are preferably all added together and compared with a suitable threshold. Exceedance of that threshold indicates the probable existence of a malicious overlay or other bug. It is appreciated that the functionality described in this paragraph provides enhanced sensitivity in detecting a film which is maliciously placed in the area of the keys of the device.

Additionally or alternatively, the self-capacitance of each of key pads 128 is read discretely and temporarily stored in a SRAM. Each value is compared with a suitably temperature adjusted baseline self-capacitance value for the same key pad 128, based on self capacitance calibration readings recorded at the factory at the time of manufacture. A difference value is calculated and compared with a threshold. Exceedance of the threshold indicates the probable existence of a malicious overlay or other bug. It is appreciated that the functionality described in this paragraph is particularly useful in sensing bugs containing a conductor which is located in the area of the keys of the device.

Additionally or alternatively, the self-capacitance of each of key pads 128 is read discretely and temporarily stored in a SRAM. Each value is compared with a suitably temperature adjusted baseline self-capacitance value for the same key pad 128, based on self capacitance calibration readings recorded at the factory at the time of manufacture. Suitable difference values are calculated. The absolute values of the difference values are preferably all added together and compared with a suitable threshold. Exceedance of that threshold indicates the probably existence of a malicious overlay or other bug. It is appreciated that the functionality described in this paragraph provides enhanced sensitivity in detecting a film which is maliciously placed in the area of the keys of the device.

Additionally or alternatively, the self-capacitance of each of key pads 128 and each of floods 140 is read discretely and temporarily stored in a SRAM. Each value is compared with a suitably temperature adjusted baseline self-capacitance value for the same key pad 128 or flood 140, based on self capacitance calibration readings recorded at the factory at the time of manufacture. Suitable difference values are calculated. The absolute values of the difference values are preferably all added together and compared with a suitable threshold. Exceedance of that threshold indicates the probably existence of a malicious overlay or other bug. It is appreciated that the functionality described in this paragraph provides enhanced sensitivity in detecting a film which is maliciously placed in the area of the keys of the device.

In accordance with a preferred embodiment of the invention, a suitably temperature adjusted baseline self-capacitance value for each pad 128 and flood 140 preferably is obtained as follows: At the factory, at the time of manufacture, self-capacitance is measured at two different temperatures and the resulting base readings are stored. During operation of the device, the current temperature in the vicinity of the pads 128 and floods 140 is sensed and used with the baseline readings to provide temperature adjusted baseline readings. Preferably a linear function is employed for extrapolation or interpolation as appropriate.

It is appreciated that the above-described functionality represents an example of the type of self-capacitance based security functionality that may be employed in accordance with embodiments of the present invention. Various alternatives may be employed, alternatively or sequentially depending on the context and the required sensitivity and reliability.

Additionally in accordance with a preferred embodiment of the present invention, malicious overlay detection is provided by sensing mutual capacitance between various ones of key pads 128 and bug sensing floods 140, while autotuning functionality is disabled as described below:

Preferably a sawtooth signal is applied simultaneously to those of pads 128 and/or floods 140 indicated as TX in Table 1 below and the mutual capacitance between the TX pads 128 and/or floods 140 and those of pads 128 and/or floods 140 indicated as RX is measured. This signal may be at one or more frequencies, typically 20 KHZ and 200 KHZ.

TABLE 1

| protocol | transmit TX | receive RX |
|---|---|---|
| A | PADS 128:<br>1, 2, 3, 4, 5, 6, 7, 8, 9, *, 0, # | FLOODS 140:<br>1, 2, 3 & 4 |
| B | PADS 128:<br>1, 4, 7, *, 3, 6, 9, # | PADS 128:<br>2, 5, 8, 0 |
| C | PADS 128:<br>1, 2, 3, 4, 6, 7, 9, *, 0, # | PADS 128:<br>5, 8 |
| D | FLOODS 140:<br>1, 2, 3 & 4 | PADS 128:<br>1, 2, 3, 4, 5, 6, 7, 8, 9, *, 0 & # |

Various mutual capacitance protocols may be employed, examples of which are shown in Table 1. Thus it is appreciated that the protocols and the selections of pads 128 as TX or RX pads and floods 140 as TX or RX floods represent examples of possible protocols and selections.

The readings on each of the RX pads and/or floods are temporarily stored in a SRAM. Each value is compared with a suitably temperature adjusted baseline mutual-capacitance value for the same RX pad 128 and/or RX flood 140, based on mutual capacitance calibration readings recorded at the factory at the time of manufacture. A difference value is calculated and compared with a threshold. Exceedance of the threshold indicates the probably existence of a malicious overlay or other bug. It is appreciated that the functionality described in this paragraph is particularly useful in sensing bugs containing a conductor which are located in the area of the keys of the device.

It is appreciated that the foregoing functionality may be carried out for each applied frequency separately or the results for multiple applied signal frequencies may be combined.

Referring to Table 1, it is seen that there are provided four exemplary mutual capacitance sensing protocols, designated by the letters A, B, C and D. It is appreciated that any one or more protocols may be employed. It is further appreciated that any other suitable mutual capacitance sensing protocols may be employed in accordance with the present invention. It is further appreciated that firmware including additional or alternative capacitance sensing protocols may be securely field downloaded, from time to time, to the secure PIN entry devices of the present invention and particularly to the security management circuitry, such as that embodied in a CY8C20666 chip, as by the use of secure bootloaders.

The functionality of mutual capacitance sensing for bug detection is now described generally: Using the example of protocol A, it is seen that a suitable signal is preferably simultaneously applied to all of the listed TX pads 128, namely 1, 2, 3, 4, 5, 6, 7, 8, 9, *, 0, #. Received signals are read simultaneously or sequentially at each of the listed RX floods 140, namely floods 1, 2, 3 & 4, where flood 1 surrounds keys 1, 2 & 3; flood 2 surrounds keys 4, 5 & 6; flood 3 surrounds keys 7, 8 & 9; and flood 4 surrounds keys *, 0 & # and the resulting values are stored in a memory, preferably a SRAM. A difference value is calculated for each flood 140, namely floods 1, 2 3 & 4 using a suitably temperature corrected baseline for each of the floods, established at the factory at the time of manufacture. The difference values may each be compared separately with an appropriate threshold, or a sum of the absolute values of the difference values may be compared with a suitable threshold.

Independently of the protocol employed, if one or more threshold is exceeded, security management circuitry incorporated in the PIN entry device, which may include alarm indication circuitry coupled to protective grids of the type described above, takes appropriate measures to ensure the security of the PIN entry device. These measures may include, for example, preventing prompts for PIN entry, preventing PIN entry, preventing operation of the PIN entry device, transmitting an alarm indication to a remote location and providing human sensing alarm indications such as audible or visible indications.

Additionally or alternatively, the mutual capacitance of each of TX pads 128 and/or floods 140 and each of the RX pads 128 and/or floods 140 is read discretely and temporarily stored in a SRAM. Each value is compared with a suitably temperature adjusted baseline mutual-capacitance value for the same pair of TX pads 128 and/or floods 140 and each of the RX pads 128 and/or floods 140 based on mutual capacitance calibration readings recorded at the factory at the time of manufacture. Suitable difference values are calculated. However, as distinct from the functionality described in the preceding paragraph, the absolute values of the difference values are preferably all added together and compared with a suitable threshold. Exceedance of the threshold indicates the probable presence of a malicious overlay or other bug.

The sensitivity and responsiveness of the security management circuitry may be modified as appropriate by secure field downloads, from time to time, to the secure PIN entry devices of the present invention and particularly to the security management circuitry, such as that embodied in a CY8C20666 chip, as by the use of secure bootloaders.

The above description references to sensing capacitance values, it being appreciated that such sensing may be achieved by reading one or more of voltage, current other electrical metric. Sensed changes in capacitance of an element, when suitably corrected for environmental factors from a baseline reflect corresponding changes in the dielectric characteristics in the vicinity of the element and are here used to detect the presence of maliciously placed bugs.

Changes in dielectric characteristics of multiple elements may be combined in various ways, which may but not necessarily include calculation of absolute values. Various other types of summing calculations may be employed, as appropriate.

It is also appreciated that various self-capacitance and mutual capacitance sensing protocols may be applied inter alia to elements of the case open switches, as appropriate.

It will be appreciated by persons skilled in the art that the present invention is not limited by what has been particularly shown and described hereinabove. Rather the present invention includes both combinations and subcombinations of various features described hereinabove as well as modifications and variations thereof which would occur to a person skilled in the art upon reading the foregoing and which are not in the prior art.

The invention claimed is:

1. A secure PIN entry method comprising:
   receiving a PIN from a user at a PIN entry assembly, said PIN entry assembly including a first plurality of key pads and a second plurality of bug sensing floods, electrically insulated from and adjacent to said first plurality of key pads; and
   checking at least part of said PIN entry assembly for the presence of an unauthorized PIN eavesdropping element thereat and providing an output indicating whether a predetermined security check has been successfully completed,
   said checking comprising employing bug detection circuitry for checking said at least part of said PIN entry assembly for the presence of an unauthorized PIN eavesdropping element thereat,
   said employing said bug detection circuitry including:
      simultaneously generating an electromagnetic field at at least some of said first plurality of key pads and said second plurality of bug sensing floods; and
      sensing mutual capacitance between some of said first plurality of key pads and said second plurality of bug sensing floods and others of said first plurality of key pads and said second plurality of bug sensing floods resulting from said electromagnetic field thereat, said sensing mutual capacitance being operative in a key entry detection mode using autotuning circuitry and in a security scan mode not using autotuning circuitry.

2. The secure PIN entry method according to claim 1 and also comprising in the event of discovery of a bug, providing an output alarm and disabling one or more functions of the PIN entry assembly.

3. The secure PIN entry method according to claim 1 and also comprising case-open detection.

4. The secure PIN entry method according to claim 3 and wherein said case open detection is operative, in the event of a case open condition being detected, to at least one of provide an output alarm and disable one or more functions of the PIN entry assembly.

5. The secure PIN method according to claim 1 and wherein said sensing mutual capacitance, when operative in said security scan mode, combines changes in sensed mutual capacitance of a plurality of elements of said secure PIN entry assembly which exceed a predetermined threshold in order to ascertain whether a bug is present.

6. A secure data entry method comprising:
   receiving data from a user at a data entry assembly, said data entry assembly including multiple elements including a first plurality of key pads and a second plurality of bug sensing floods, electrically insulated from and adjacent to said first plurality of key pads;
   preventing receipt of said data by said data entry assembly unless a predetermined security check has been successfully completed; and
   checking at least part of said data entry method for the presence of an unauthorized data eavesdropping element thereat by sensing mutual capacitance of at least one of said bug sensing floods with at least another element of said data entry assembly and providing an output indicating whether said predetermined security check has been successfully completed, said mutual capacitance sensing being operative in a key entry detection mode using autotuning circuitry and in a security scan mode not using autotuning circuitry.

7. The secure data entry method according to claim 6 and wherein said mutual capacitance sensing, when operative in a security scan mode, combines changes in sensed mutual capacitance of a plurality of elements of said secure data entry assembly which exceed a predetermined threshold in order to ascertain whether a bug is present.

8. The secure data entry method according to claim 6 and wherein said mutual capacitance sensing comprises;
   applying a signal to at least some of said first plurality of said key pads;
   receiving signals from at least some of said second plurality of bug sensing floods; and calculating a difference value for each of said at least some of said second plurality of bug sensing floods vis-à-vis a suitably temperature corrected baseline for each of said at least some of said second plurality of bug sensing floods.

9. The secure data entry method according to claim 8 and also comprising comparing a sum of the absolute values of said difference values with a suitable threshold.

10. The secure data entry method according to claim 6 and wherein said mutual capacitance sensing comprises;
  applying a signal to at least some of said first plurality of said key pads;
  receiving signals from at least others of said first plurality of key pads; and
  calculating a difference value for each of said others of said first plurality of key pads vis-à-vis a suitably temperature corrected baseline for each of the floods.

11. The secure data entry method according to claim 10 and also comprising comparing a sum of the absolute values of said difference values with a suitable threshold.

12. The secure data entry method according to claim 6 and wherein said mutual capacitance sensing comprises;
  simultaneously applying a signal to at least some of said second plurality of said bug sensing floods;
  receiving signals from at least some of said first plurality of key pads; and
  calculating a difference value for each of said some of said first plurality of key pads vis-à-vis a suitably temperature corrected baseline for each of the some of said first plurality of key pads.

13. The secure data entry method according to claim 12 and also comprising comparing a sum of the absolute values of said difference values with a suitable threshold.

14. The secure PIN entry method according to claim 3 and also comprising mutual capacitance sensing applied to elements of case-open switches.

15. The secure PIN entry method according to claim 1 and wherein at least one of said second plurality of bug sensing floods comprises a mesh.

* * * * *